Nov. 6, 1928.
W. B. BURKE
1,690,615
MECHANISM FOR VULCANIZING TIRES
Filed June 11, 1923
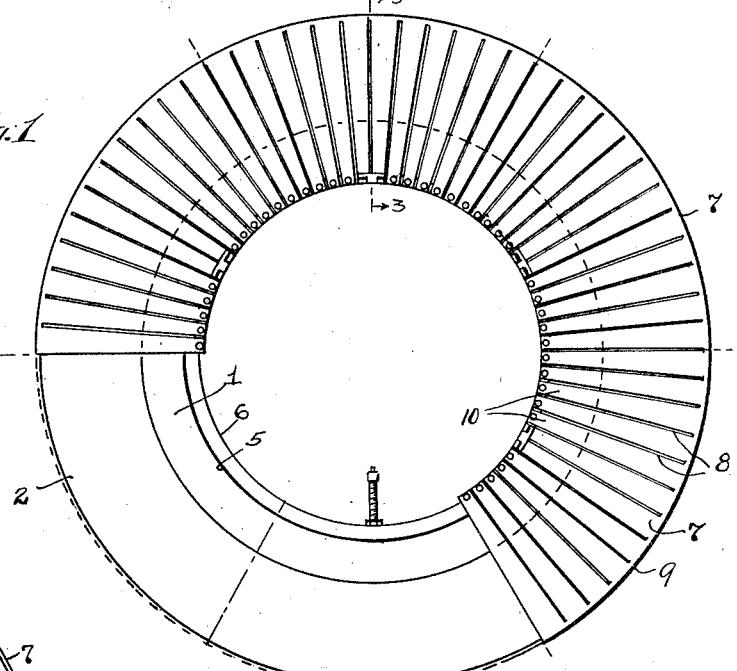
Fig. 1
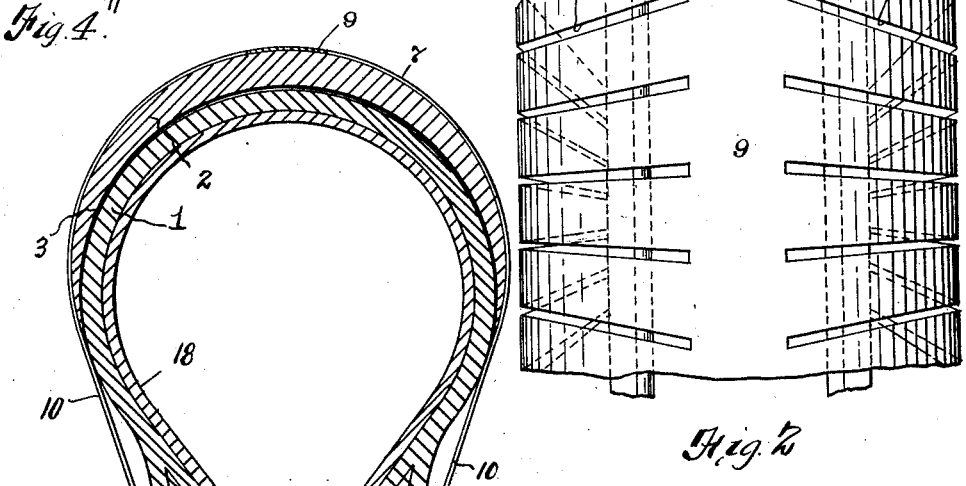
Fig. 4.
Fig. 3.
Fig. 2.
INVENTOR.
Wilbur B. Burke
BY
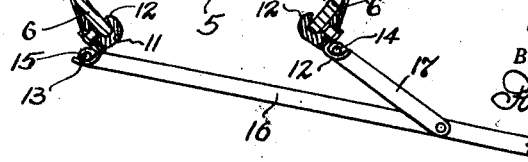
ATTORNEYS Patented Nov. 6, 1928.

1,690,615

UNITED STATES PATENT OFFICE.

WILBUR B. BURKE, OF EAST CLEVELAND, OHIO.

MECHANISM FOR VULCANIZING TIRES.

Application filed June 11, 1923. Serial No. 644,654.

The present improvements relate more particularly to an apparatus or mechanism suitable for use in carrying out the improved method of vulcanizing tire treads to casings which forms the subject matter of U. S. Letters Patent No. 1,216,654, granted to me under date of February 20, 1917. The method in question, briefly stated, involves the interposition, between the body or carcass of a tire casing and the tread which is to be vulcanized thereto, of a vulcanizing element which consists of a layer of fresh rubber having an electrical heating element in contact therewith. Upon placing the parts in question under suitable pressure and thereupon passing an electric current through such heating element the layer of fresh rubber may be vulcanized to exactly the proper degree and thereby bind the other parts of the completed tire together without heating the latter so as to excessively vulcanize the same, to their detriment.

In my aforesaid Patent, No. 1,216,654, as well as in my subsequently issued Patent No. 1,339,736, dated May 11, 1920, for an improvement in the construction of the aforesaid vulcanizing element, and in method of making such elements, the disclosed method for assembling the several parts together, and securing the desired degree of pressure preparatory to passing the electric current through the resistance component in such vulcanizing element, involves the mounting of the tire casing or carcass on a rim of the same sort and size as would be used in mounting a corresponding tire on a vehicle wheel, such rim having radially projecting incurved or outwardly inclining flanges, depending upon whether the tire is of the clincher or straight-side type. An inner tube is included within the casing so that upon inflation of such tube the casing may be expanded and thus press the outer surface of the same against the inner surface of the vulcanizing element, which is held in place during the operation in question by means of a tape or the like wrapped or wound around the rim, casing and tread, so that upon such inflation of the inner tube the casing and tread will be pressed together under a proper degree of pressure.

I have found, however, that by this method the degree of pressure which can be secured is limited by the fact that when the tire casing is once fully distended it cannot of course be further expanded, (that is without bursting), any more than when a tire is mounted upon a vehicle wheel rim. Furthermore, the lower portions of the sides of the tread which is to be vulcanized to the tire casing are not held against the latter as tightly by such wrapping of tape or the like as the outer portion of the tread, so that it is not always possible to secure a satisfactory union of the lateral edges of the tread to the casing. Finally, the wrapping of tape around the parts in question is a more or less tedious matter and one that requires some skill if the proper degree of pressure is to be obtained when the tire is distended by inflation of the inner tube.

One object of the present invention, accordingly, is to provide means for assembling the parts referred to in such a way as to insure that a uniform pressure will be secured between the casing and tread to be vulcanized thereto through the entire transverse extent of the latter, i. e., from its one lateral edge to the other. Another object is to permit of variation in the pressure by simply varying the pressure of the air or other fluid wherewith the inner tube is filled during the operation. Still another object is to provide an equipment that will be capable of ready assembly and disassembly, and thus render the operation a simple and convenient one even where tire casings of the largest size are being handled. To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of my improved mechanism shown in partly assembled condition with a tire casing, and tread which is to be vulcanized thereto, in place; Fig. 2 is a broken top plan view on a somewhat larger scale of one element of such mechanism; Fig. 3 is a transverse section through such mechanism with tire casing and tread in place therein, the plane of the section being indicated by the line 3—3, Fig. 1; and Fig. 4 is a perspective on a somewhat larger scale, of a detail.

As indicated in Fig. 1, as well as in Fig. 2, the tire casing or carcass 1, with the tread 2 and interposed vulcanizing element 3, are there shown properly arranged for the vulcanizing operation. The construction of such vulcanizing element may be assumed to be that shown in either of my aforesaid patents, and so need not be described in detail, and to avoid confusing the showing in the several figures of the drawing, the wiring whereby the necessary electric current is supplied to the resistance component of such vulcanizing element has been omitted.

In my present improved mechanism, instead of mounting such casing on a rim with outwardly directed flanges as heretofore, I employ a base 5 that consists of a band with an outwardly directed face of plain cylindrical form, the external diameter of such band being the same as the internal diameter of the casing. However, for a purpose presently to be described, such band is provided with radially inwardly directed flanges 6 along the respective sides, such flanges preferably inclining towards the center of the band, as shown in Fig. 5.

Instead of employing a tape or equivalent element which is wrapped or wound around the rim, casing and tread, I utilize a series of shoes consisting of segmental shells 7 of metal or equivalent non-stretchable material and of the form and construction clearly shown in the drawing. These shells, in other words, are formed of flat sheets by stamping or cutting in the latter two series of slits 8 that extend oppositely from a central continuous portion 9 to the respective lateral edges of the sheet. The slits are initially wider at their outer ends, thereby leaving intermediate strips 10 of metal narrower at their outer ends so that such strips are of general V-shape. The inner ends of the strips are then brought substantially together and attached, by riveting, welding or otherwise permanently securing same, to longitudinally curved bars 11 of angular cross-section, as shown in Fig. 3. The slits 8 are thus left of substantially uniform width throughout their extent, and the resultant structure is a shell of the desired segmental form, the angular portions of the bars 11 forming inturned hooks 12 that are adapted to engage with the respective flanges 6 of the band 5. The number of such shells may vary by dividing the circumference of the tire into any desired number of equal parts, and making shells to correspond with such parts. Thus, in the illustrated form eight such shells are provided, these when placed together in end-to-end relation serving to entirely enclose the tire and secure the same on to the band or base 5.

For the purpose of thus attaching the shells or shoes 7, each is provided at approximately the midpoints of its respective lower edges with outwardly directed paired hooks 13 that are arranged to be engaged by transverse pins 14 and 15 in the ends of the respective parts of the implement shown in Fig. 3. One part of such implement consists of a handled lever 16, and the other of a link 17 pivotally attached thereto near its inner or operating end. When it is desired to either secure a shoe in place or remove one from the tire, the pin on the end of the lever 16 is engaged with one hook 13, and the pin on such link 17 engaged with the other hook 13, whereupon, by swinging the lever as shown in Fig. 3, the hook 12, on the left-hand bar 11, may be readily engaged with, or disengaged from, the corresponding flange 6.

The method of operation may now be briefly explained. Assuming a tire casing 1, with tread 2 and vulcanizing element 3 to have been secured in place on the band or base 5 by means of shoes of the aforesaid construction, it will be seen that the tire-casing is free to be pressed against such shoes under substantially a uniform pressure from its one lateral edge to the other upon inflation of the inner tube 18; this for the reason that there are no flanges on the base in engagement with the beads of the shoe to restrain the free movement of the latter. Accordingly, not only will the casing be pressed against the vulcanizing element, and thus against the tread uniformly throughout the entire extent of the latter, but such pressure is not limited, as in the previous construction, when the pressure within the tube becomes sufficient to fully expand the same within the casing. On the contrary, the lateral portions of the latter are free to spread, save as such spreading movement is limited by the enclosing shells 9. The latter are of course made strong enough to resist any degree of pressure from within which it may be found necessary to apply.

The placing of the tire casing on the base 5 is of course facilitated by doing away with any externally directed flanges on such base, and, similarly, the application of the shells around the assembled tire parts is a matter of simple manipulation, which even an unskilled operator can carry out with the assistance of a tool such as described. Finally, the pressure that is applied between the tire casing and tread is entirely regulated by the degree to which the inner tube 17 is inflated, so that the necessity for properly wrapping or tying the casing down in order correctly to gauge such pressure is entirely eliminated.

It will be understood that the utility of my invention is not necessarily limited to operations in which a tread is to be applied to a tire-casing about its entire circumference. Thus a single section of the shell may be advantageously employed in repair operations where a patch is to be applied to the casing or a portion only of the tread substituted.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism for vulcanizing together the parts of a tire casing, the combination of a base adapted to fit within the beads of such casing; a shell of non-stretchable material engageable against the exterior of the assembled casing; interengaging means on the shell and the base for detachably securing the same together; and means for expanding said casing from within, said base providing an unobstructed seat for such beads whereby free lateral movement of the latter into contact with said shell is permitted.

2. In mechanism for vulcanizing together the parts of a tire casing, the combination of a base adapted to fit within the beads of such casing; a shell of non-stretchable material engageable against the exterior of the assembled casing, said shell being composed of segmental sections; interengaging means on the shell and the base for detachably securing the same together; and means for expanding said casing from within, said base providing an unobstructed seat for such beads whereby free lateral movement of the latter into contact with said shell is permitted.

3. In mechanism for vulcanizing together the parts of a tire-casing, the combination of a base comprising a rim adapted to fit within the beads of such casing, free lateral movement of such beads being permitted on said base; radially inwardly projecting flanges on said base; a shell of non-stretchable material conforming to the exterior of the assembled casing, said shell being composed of segmental sections respectively provided with elements adapted detachably to engage with said flanges on the base; and means for expanding said casing from within.

4. In mechanism for vulcanizing together the parts of a tire-casing, the combination of a base comprising a rim adapted to fit within the beads of such casing, free lateral movement of such beads being permitted on said base; radially inwardly projecting flanges on said base; a shell conforming to the exterior of the assembled casing, said shell being composed of segmental sections each formed from a sheet of metal having a series of oppositely directed slits cut therein and the outer ends of the intermediate strips attached to suitable bars; inwardly directed hooks carried by said bars adapted detachably to engage with said flanges on the base; and means for expanding said casing from within.

5. In mechanism for vulcanizing together the parts of a tire-casing, the combination of a base comprising a rim adapted to fit within the beads of such casing, free lateral movement of such beads being permitted on said base; radially inwardly projecting flanges on said base; a shell conforming to the exterior of the assembled casing, said shell being composed of segmental sections each formed from a sheet of metal having a series of oppositely directed slits cut therein and the outer ends of the intermediate strips attached to suitable bars; inwardly directed hooks carried by said bars adapted detachably to engage with said flanges in the base; outwardly directed projections similarly carried by said bars, whereby said shell-sections may be attached to and detached from said base; and means for expanding said casing from within.

6. As an article of manufacture, a shell for securing a tire-casing to a suitable base, said shell consisting of a sheet of metal having a series of oppositely directed slits cut therein and the outer ends of the intermediate strips attached to curved bars, whereby said shell is shaped to conform to a segmental portion of such a casing.

Signed by me, this 9th day of June, 1923.

WILBUR B. BURKE.